United States Patent
Weston

(10) Patent No.: US 8,773,586 B2
(45) Date of Patent: Jul. 8, 2014

(54) MOTION IMAGE RENDERING SYSTEMS AND METHODS

(71) Applicant: Snell Limited, Reading (GB)

(72) Inventor: Martin Weston, Petersfield (GB)

(73) Assignee: Snell Limited, Reading, Berkshire (GB)

( * ) Notice: Subject to any disclaimer, the term of this patent is extended or adjusted under 35 U.S.C. 154(b) by 0 days.

(21) Appl. No.: 13/867,298

(22) Filed: Apr. 22, 2013

(65) Prior Publication Data

US 2013/0229573 A1 Sep. 5, 2013

Related U.S. Application Data

(62) Division of application No. 12/633,949, filed on Dec. 9, 2009, now Pat. No. 8,432,487.

(30) Foreign Application Priority Data

Dec. 9, 2008 (GB) .................................. 0822413.1

(51) Int. Cl.
*H04N 7/01* (2006.01)

(52) U.S. Cl.
USPC .......................................................... 348/441

(58) Field of Classification Search
USPC ......... 348/441, 443, 446, 447, 458, 459, 448, 348/625
See application file for complete search history.

(56) References Cited

U.S. PATENT DOCUMENTS

| | | | |
|---|---|---|---|
| 5,162,907 A * | 11/1992 | Keating et al. ........... | 375/240.16 |
| 5,221,966 A | 6/1993 | Clayton et al. | |
| 5,313,281 A | 5/1994 | Richards | |
| 5,337,154 A | 8/1994 | Dorricott et al. | |
| 5,353,119 A * | 10/1994 | Dorricott et al. .............. | 348/446 |
| 5,430,489 A * | 7/1995 | Richards et al. .............. | 348/446 |
| 5,734,420 A | 3/1998 | Lee et al. | |
| 5,822,007 A * | 10/1998 | Knee et al. ................. | 348/416.1 |
| 5,929,919 A | 7/1999 | De Haan et al. | |
| 6,480,232 B1 * | 11/2002 | Wilson et al. ................. | 348/459 |
| 6,545,740 B2 | 4/2003 | Werner | |
| 7,103,231 B2 | 9/2006 | Cornog et al. | |
| 7,158,186 B2 * | 1/2007 | Selby et al. .................... | 348/459 |
| 7,295,245 B2 | 11/2007 | Ha | |
| 7,391,472 B1 | 6/2008 | Woodall | |
| 7,432,986 B2 * | 10/2008 | Winger ......................... | 348/625 |
| 7,440,031 B2 | 10/2008 | Jung | |
| 7,499,102 B2 * | 3/2009 | Lee et al. ....................... | 348/441 |

(Continued)

FOREIGN PATENT DOCUMENTS

| | | |
|---|---|---|
| EP | 2046029 | 4/2009 |
| WO | 2005071957 | 8/2005 |
| WO | 2008018882 | 2/2008 |

OTHER PUBLICATIONS

GB 0822413.1 United Kingdom Search Report dated Apr. 16, 2009; 1 page.

(Continued)

*Primary Examiner* — Paulos M Natnael
(74) *Attorney, Agent, or Firm* — Michael Best & Friedrich LLP

(57) ABSTRACT

Systems and methods of rendering a motion image. Input temporal image-samples are temporally interpolated to create the output sequence and an intentional, periodic motion-judder component that is visible when the output temporal image-samples are displayed is introduced.

13 Claims, 15 Drawing Sheets

(56) References Cited

U.S. PATENT DOCUMENTS

| | | | |
|---|---|---|---|
| 7,596,177 B2 | 9/2009 | Imagawa et al. | |
| 7,791,672 B2 | 9/2010 | Kim et al. | |
| 8,405,770 B2 * | 3/2013 | White et al. | 348/452 |
| 8,432,487 B2 * | 4/2013 | Weston | 348/441 |
| 8,462,266 B2 * | 6/2013 | Ueno et al. | 348/452 |
| 2005/0013496 A1 | 1/2005 | Bruls et al. | |
| 2005/0078212 A1 | 4/2005 | Ha | |
| 2010/0013989 A1 * | 1/2010 | Zhou et al. | 348/441 |
| 2010/0238355 A1 | 9/2010 | Blume | |
| 2011/0128448 A1 | 6/2011 | Bellers et al. | |

OTHER PUBLICATIONS

GB 0822413.1 United Kingdom Search Report dated Jul. 29, 2013; 3 pages.

* cited by examiner (Prior-Art)

MOTION IMAGE RENDERING SYSTEMS AND METHODS

RELATED APPLICATION

The present patent application is a divisional of U.S. patent application Ser. No. 12/633,949, filed Dec. 9, 2009, now U.S. Pat. No. 8,432,487, which claims the benefit of prior filed United Kingdom Patent Application No. 0822413.1, filed on Dec. 9, 2008; the entire content of each are hereby incorporated by reference.

FIELD OF THE INVENTION

This invention concerns the rendering of motion images. It is particularly applicable to the rendering of 24 frame per second film in 60 field per second television systems.

BACKGROUND

Film, television and similar imaging systems portray moving images by presenting a viewer with a sequence of still images that correspond to temporal samples of a scene. The rate of presentation of new images and the duration of presentation of each image are crucial factors in determining the subjective quality of the viewing experience. Historically the rate of presentation of new images was identical to the rate of image acquisition in a camera; and, the duration of presentation was limited by available display system technology. In modern image processing systems it is possible for these display characteristics to be determined independently of the parameters of the image acquisition, storage and distribution mechanisms.

Where moving images are acquired by photography the temporal sampling frequency (i.e. the frame rate) is limited by the mechanical processes of film transport. This has lead to the widespread adoption of a temporal sampling frequency of 24 Hz (frames per second). In television there is no mechanical limitation, but it is still necessary to allow sufficient "exposure time" for each image to be acquired by the electronic sensor; temporal sampling frequencies (field rates) of 50 Hz and 60 Hz are common.

In mechanical film projection the duration of presentation of each image is less than the temporal sampling period (because of the time for film transport); however, because of the relatively-low temporal sampling rate, each image is repeated (flashed) one or more times to make the resulting flicker imperceptible. In television, because of the higher temporal sampling rate, each image is usually only displayed once. There are thus significant subjective differences between the film and television viewing experiences.

Further complications arise when film-originated material is displayed via television. When (as in Europe) the television field rate is approximately twice the film frame rate, normal practice is to adjust the film frame rate (with possible change to the duration of the material) to equal the televisions frame rate, so that each film frame is displayed twice (as two consecutive television fields). In countries where the television field rate is approximately 60 Hz (such as the USA) film frames are shown in a '3:2' sequence in which alternate film frames are shown three times and twice, respectively. This is a compromise which gives an inferior viewing experience.

These methods of presenting film via the television medium thus give a viewing experience that may be substantially different from that intended by the cinematographer and represent, in varying degree, a distortion of the intended viewing experience.

It is common to combine film-originated and television-originated material in the same television presentation. Often, the difference in viewing experience due to the different method of image acquisition represents an undesirable distraction for the viewer. It often preferable for the entire presentation to have either, the 'film-look' or the 'television look' according to the intention of the director. In other cases it may be desirable to artificially increase the subjective difference between different parts of the same presentation for artistic reasons.

It is thus advantageous to be able to control the subjective viewing experience of televised material in order to achieve a desired type of motion rendition. Known systems include temporal interpolation (sometimes including motion-compensation) that up-converts from the temporal sampling frequency of the film frames to the temporal sampling frequency of the television system. Usually the up-conversion is to the field rate of an interlaced television system; such conversion may be performed optically, for example in a 'polygon' telecine in which light from more than one film frame is combined in a rotating optical prism.

However, these prior-art systems do not accurately replicate the motion rendition of film projection in a television or other electronic moving image rendition system.

SUMMARY

The invention consists in a method and apparatus for modifying an input sequence of temporal image-samples representing a moving image so as to obtain an output sequence of temporal image-samples in which the appearance of the said motion has been changed wherein the said input temporal image-samples are temporally interpolated to create the said output sequence and an intentional, periodic motion-judder component is introduced that is visible when the said output temporal image-samples are displayed.

In a preferred embodiment the said intentional, periodic motion-judder component is chosen so that the said appearance of motion replicates cinematic projection.

In certain embodiments the said intentional, periodic motion-judder component periodically reverses the apparent direction of motion.

Suitably, the said intentional motion-judder component is determined by a sine function.

Advantageously, the magnitude of the motion-judder component applied to a temporal image-sample is proportional to the instantaneous value of a temporal sinewave at the intended time of display of that temporal image-sample.

Preferably, the frequency of the said temporal sinewave is equal to the original temporal sampling frequency of the input temporal image-samples.

Another embodiment comprises a method of representing nominal 24 frame per second film frames in a nominal 60 field per second television system wherein respective television fields are created in a five field sequence in which the first television field corresponds to a film frame; and the second, third, fourth and fifth fields are created by temporally interpolating film frames either forwards or backwards by a time equal to 17.1% of the reciprocal of the film frame rate.

A further embodiment comprises a method of modifying a sequence of television images corresponding to a nominal temporal sampling rate of 60 Hz in which the said images are modified according to a five-image sequence where: the first image is unmodified; the second image is temporally shifted backwards by 30.9% of the time between adjacent images in the sequence; the third and fourth fields are interchanged;

and, the fifth image is temporally shifted forwards by 30.9% of the time between adjacent images in the sequence.

In one embodiment, the invention provides a method of modifying, in a processor, an input sequence of temporal image-samples representing a moving image so as to obtain an output sequence of temporal image-samples in which the appearance of the said motion has been changed. The method includes temporally interpolating the input temporal image-samples to create the output sequence and introducing an intentional, periodic motion-judder component that is visible when the output temporal image-samples are displayed.

In another embodiment the invention provides a method of representing nominal 24 frame per second film frames in a nominal 60 field per second television system. The respective television fields are created in a five field sequence, the method includes corresponding a first television field to a film frame and creating a second field, a third field, a fourth field, and a fifth field by temporally interpolating film frames either forwards or backwards in a temporal interpolator by a time equal to 17.1% of the reciprocal of the film frame rate.

In another embodiment the invention provides a method of modifying, in a processor, a sequence of television images corresponding to a nominal temporal sampling rate of 60 Hz in which the said images are modified according to a five-frame sequence. The method includes generating a first image, a second image, a third image, a fourth image, and a fifth image. The first image is the same as a first field of the sequence. The second image is generated by temporally shifting a second field of the sequence backward by 30.9%. The third and fourth images are generated by interchanging a third field and a fourth field of the sequence. And the fifth image is generated by temporally shifting a fifth field of the sequence forward by 30.9%.

In another embodiment the invention provides an apparatus for modifying an input sequence of temporal image-samples representing a moving image so as to obtain an output sequence of temporal image-samples in which the appearance of the said motion has been changed. The apparatus includes a temporal interpolator configured to receive said input samples, and a temporal phase signal generator configured to generate a temporal phase signal. The temporal interpolator serves, through interpolation of said input samples under the control of said phase signal, to create the said output sequence, and the temporal phase signal includes a periodic motion-judder component such that intentional, visible, periodic motion-judder is introduced when the said output temporal image-samples are displayed.

In another embodiment the invention provides an apparatus for representing nominal 24 frame per second film frames in a nominal 60 field per second television system. The respective television fields are created in a five field sequence. The apparatus includes a processor configured to generate a first television field corresponding to a film frame, and a second television field, a third television field, a fourth television field, and a fifth television field created by temporally interpolating film frames either forwards or backwards by a time equal to 17.1% of the reciprocal of the film frame rate.

In another embodiment the invention provides an apparatus for modifying a sequence of television images corresponding to a nominal temporal sampling rate of 60 Hz. The images are modified according to a five-field sequence. The apparatus includes a processor configured to generate a first image, the first image the same as a first field of the sequence, a second image by temporally shifting a second field of the sequence backward by 30.9%, a third image and a fourth image by interchanging a third field and a fourth field of the sequence, and a fifth image by temporally shifting a fifth field of the sequence forward by 30.9%.

In another embodiment the invention provides a computer readable medium. The computer readable medium includes instructions configured to cause a programmable processor to modify an input sequence of temporal image-samples representing a moving image so as to obtain an output sequence of temporal image-samples in which the appearance of the said motion has been changed. The input temporal image-samples are temporally interpolated to create the output sequence and an intentional, periodic motion-judder component is introduced that is visible when the output temporal image-samples are displayed.

In another embodiment the invention provides a computer readable medium. The computer readable medium includes instructions configured to cause a programmable processor to represent nominal 24 frame per second film frames in a nominal 60 field per second television system. The respective television fields are created in a five field sequence in which a first television field corresponds to a film frame, and a second field, a third field, a fourth field, and a fifth field are created by temporally interpolating film frames either forwards or backwards in a temporal interpolator by a time equal to 17.1% of the reciprocal of the film frame rate.

In another embodiment the invention provides a computer readable medium. The computer readable medium includes instructions configured to cause a programmable processor to modify a sequence of television images corresponding to a nominal temporal sampling rate of 60 Hz in which the said images are modified according to a five-image sequence. The modification includes a first image that is unmodified, a second image that is temporally shifted backwards by 30.9% of the time between adjacent images in the sequence, a third field and a fourth field that are interchanged, and a fifth image that is temporally shifted forwards by 30.9% of the time between adjacent images in the sequence.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

An object of embodiments of the invention is to conduct a temporal resampling operation on an input sequence of temporal image-samples, such as film frames or video fields, so as to obtain a modified output sequence of temporal image-samples having a temporal sampling pattern that gives a viewer a particular intended viewing experience. The input temporal pattern will initially be assumed to be regular; i.e. having a fixed temporal sampling frequency. (Irregularly sampled inputs will be considered later in this specification.) The presentation rate of output temporal image-samples is regular, and will usually have some relationship to the input temporal sampling frequency; i.e. they will usually be submultiples of a higher common factor. The output temporal sampling pattern is often different from that represented by the regular presentation frequency of the input temporal image-samples. In other words, the relationship between the output presentation time and the corresponding input acquisition time may vary.

Figure 1:
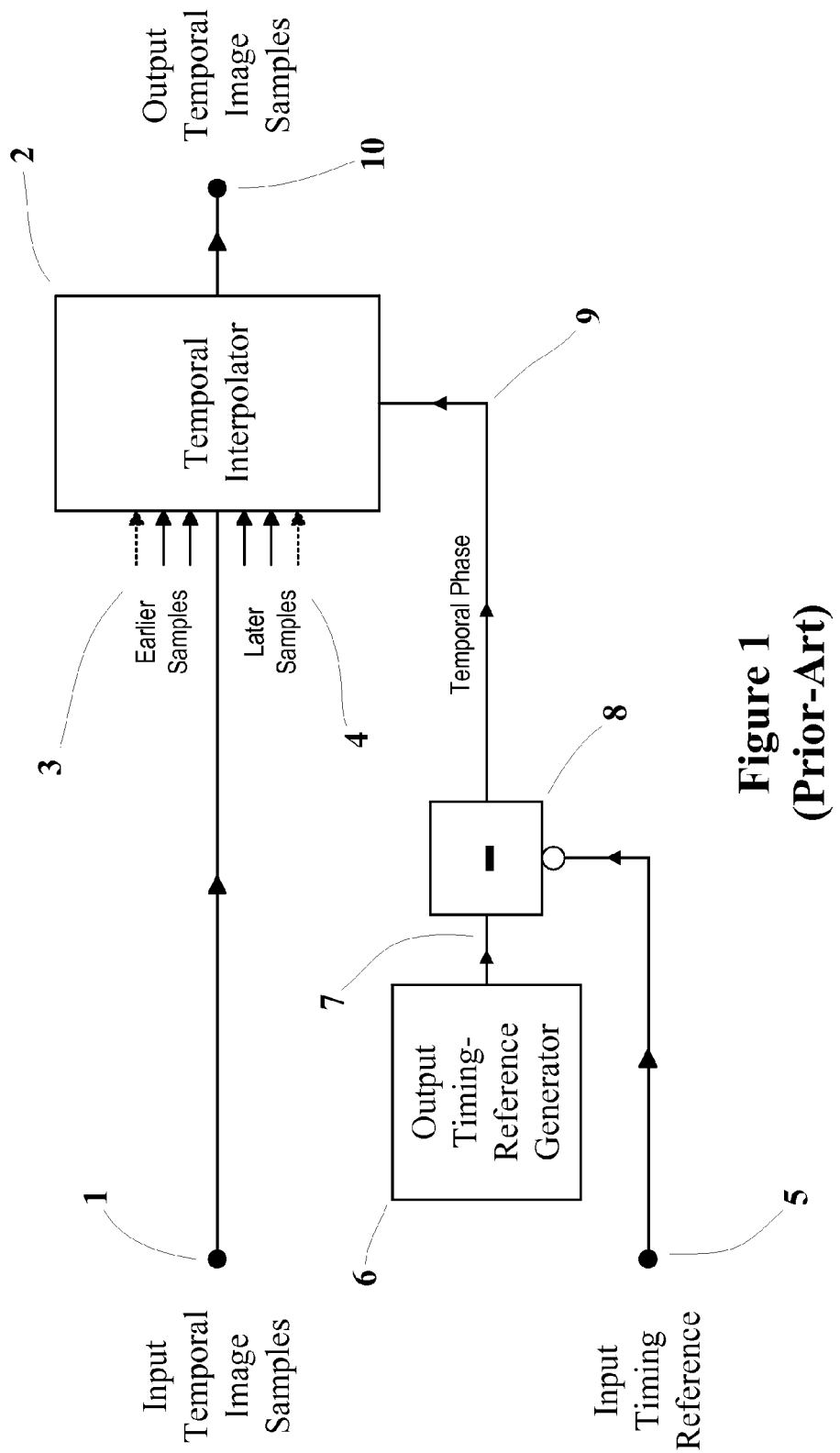
FIG. 1 shows a prior-art temporal interpolation system.

An example of a prior-art system to achieve temporal resampling is shown in FIG. 1. The figure assumes a real-time process, but the skilled person will appreciate that other techniques, including software techniques can be used to achieve the same result.

A current temporal image-sample (1) is input to a temporal interpolator (2), together with a number of earlier temporal image-samples (3) and a number of later temporal image-samples (4). In some implementations all these samples are derived by applying different delays to a stream of input image-samples. The current input temporal image-sample (1) has associated timing reference information (5) such as a field- or frame-rate clock, or time code. A desired output temporal sampling pattern is generated by an output timing reference generator (6), which produces output sample-request data (7). This data defines the time at which each output temporal image-sample is required for display. A temporal phase comparator (8) compares the required output sample time of the sample-request data (7) with the timing reference information (5) corresponding to the current input temporal image-sample (1). The result of this comparison is a temporal phase signal (9) that defines the timing difference between the required output sample and the current input sample (1). This timing difference is expressed in units of the input temporal sample period. Usually the temporal phase signal (9) is constrained to lie in the range −½ to +½.

The temporal interpolator (2) is controlled by the temporal phase signal (9). Every time an output temporal image-sample is requested, the temporal phase value is used to interpolate between the current input temporal image-sample (1) and a temporally adjacent input temporal image-sample. For example, if the temporal phase value is +½, an output image will be generated that corresponds to a time half-way between the current input temporal image-sample (1) and the succeeding temporal image-sample. The sequence of interpolated temporal image-samples is output via a terminal (10).

The temporal interpolator (2) can use any known method, including motion compensated temporal interpolation (in which the positions of objects are calculated from motion vectors and pixels are shifted by distances calculated from those vectors), and non-motion-compensated interpolation in which the required temporal phase offset is achieved by adjusting the phase of a polyphase FIR filter. Typically this process will make use of one or more preceding temporal image-samples (3) and/or succeeding temporal image-sample (4).

Typical prior-art systems use the arrangement of FIG. 1 to convert film-originated material to television field rates, or to convert between television field rates. Another system for altering the motion rendition of television images is described in U.S. Pat. No. 4,935,816, in which television fields are processed so as to replicate the motion pattern of the well-known 3:2 pull-down system. However these prior systems do not produce a viewing experience which replicates cinematic projection. Typical film projectors, employ double- or triple-flash shutters in which each film frame is displayed two or three times, respectively. This gives motion rendition quite different from television.

Figure 2:
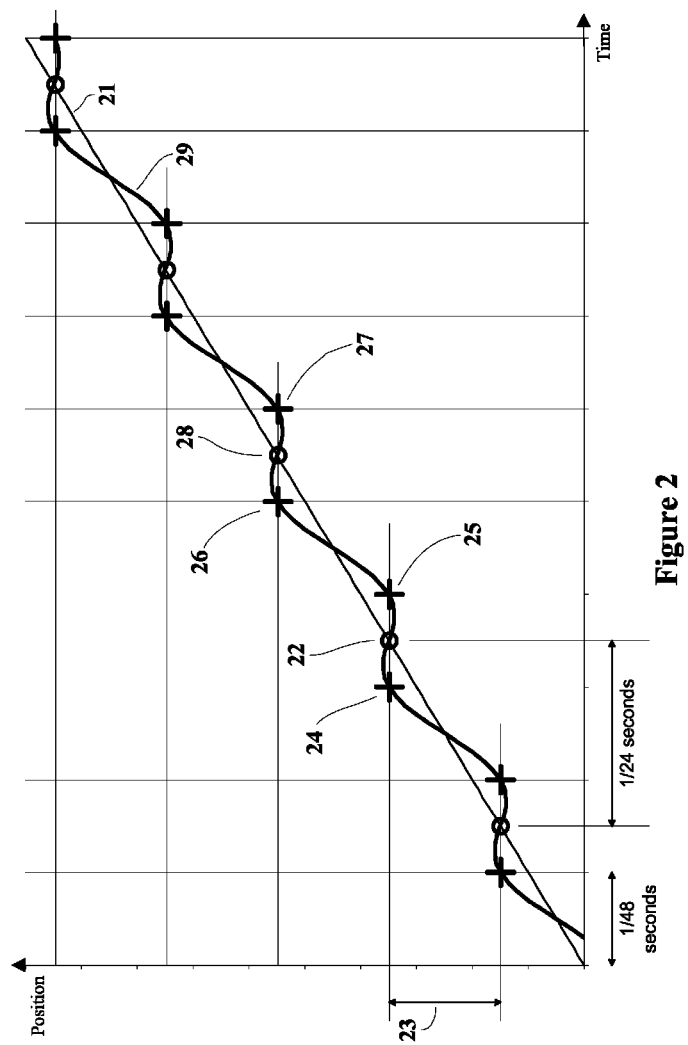
FIG. 2 shows the temporal sampling pattern of 24 frame per second film presented by a double-flash projector.

FIG. 2 shows the timing of presentation of 24 Hz-rate film frames by a double flash projector. The horizontal axis represents time, and the vertical axis represents the position of an object moving at a constant velocity. The projector flashes at twice the film frame rate, i.e. at 48 Hz; the time of each flash is indicated by the vertical grid in the Figure. The change in position of the moving object having constant velocity is represented by the straight line (21). The positions of the object as captured on successive film frames by a film camera (having a 24 Hz frame rate) are indicated by circles, such as the position (22). As both the movement and the frame rate are constant, the difference in position of the moving object between succeeding frames is constant; this distance is indicated by the dimension (23). Each film frame is shown twice by the projector; the times of presentation of frames by the projector, and the corresponding object positions are indicated in the figure by crosses. The frame corresponding to the point (22) is projected at the times indicated by the points (24) and (25). The moving object is thus shown twice at the same position. In the next film frame the object has the position (28), and that frame is projected twice, at the positions (26) and (27).

It can be seen that the motion of the object, as seen by a viewer, is no longer uniform. There is a motion judder error which is represented by the respective vertical distances between each of the points (24) (25) (26) (27) and the line (21). The error varies with time, and the fundamental frequency of this variation is 24 Hz. A sinewave at this frequency can be added to the positions indicated by the line (21) and its phase and amplitude chosen so that the sum passes through the points corresponding to all the projected images. This sum is indicated in FIG. 2 by the curve (29). The phase of the sinewave is 90° retarded with respect to the second presentation of each film frame, and the peak amplitude is 25% of the positional difference (23) between succeeding film frames (as captured by the camera).

Figure 3:
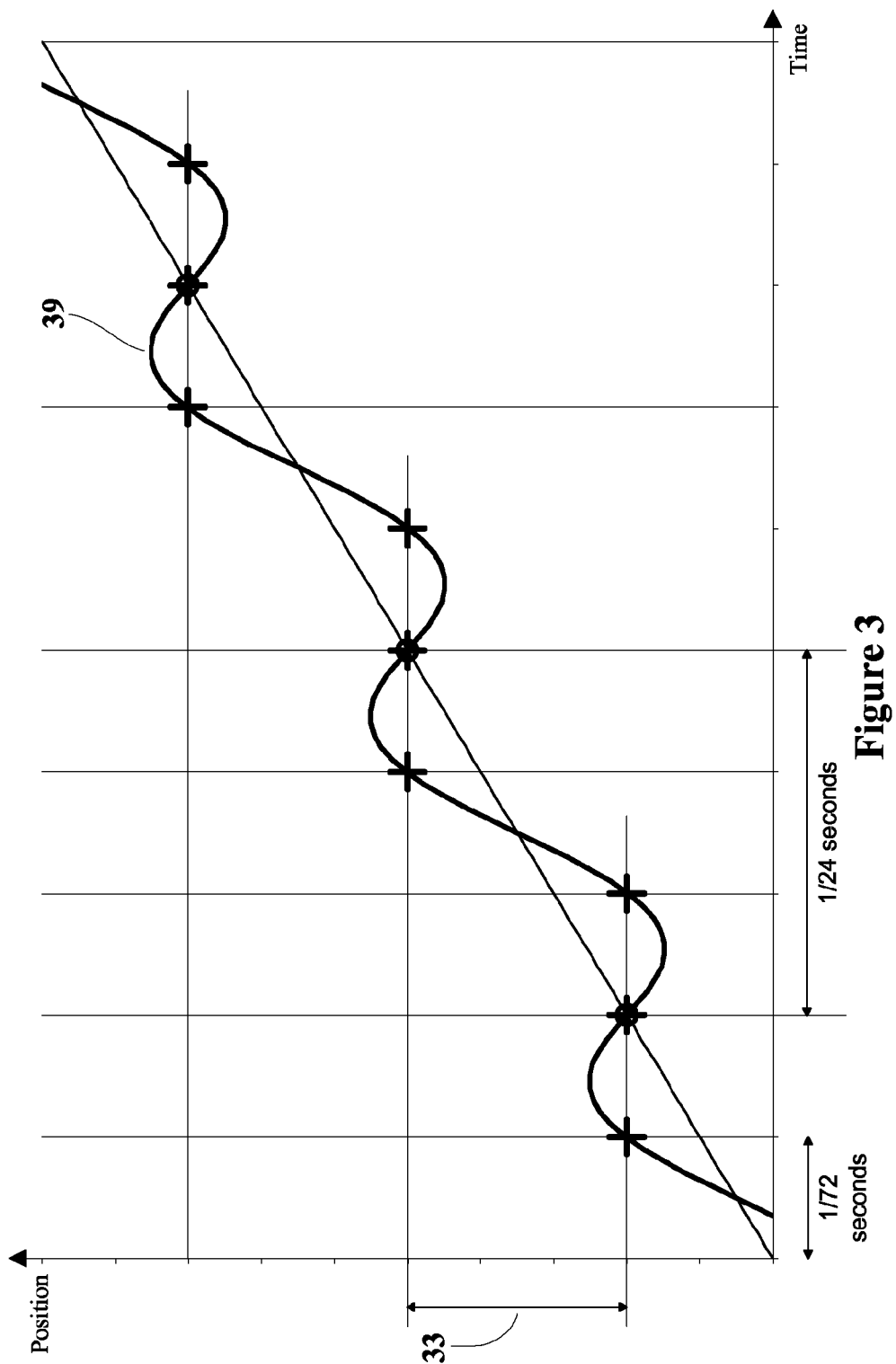
FIG. 3 shows the temporal sampling pattern of 24 frame per second film presented by a triple-flash projector.

The motion judder of a triple-flash projector displaying 24 frame per second film is shown in a similar way in FIG. 3. In this case each film frame is shown three times, once early, once at the correct time, and once late. The addition of a 24 Hz sinusoidal judder component to the uniform motion is shown by the curve (39). This sinewave, which represents the motion judder, is phase retarded by 60° with respect to the third presentation of each film frame, and has a peak amplitude of 38.5% of the positional difference (33) between (camera) film frames.

Figure 4:
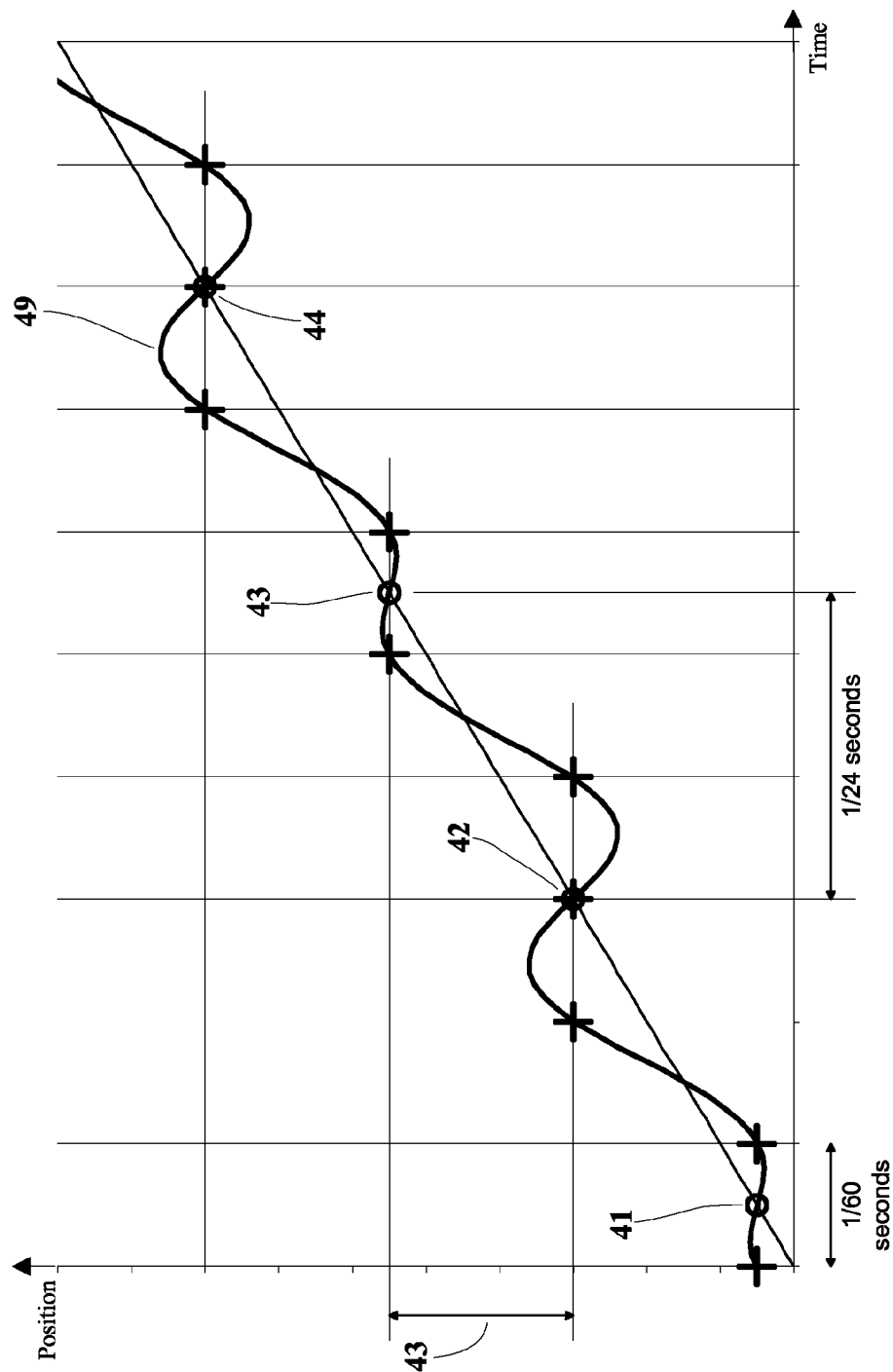
FIG. 4 shows the temporal sampling pattern of 24 frame per second film presented by a 60 field per second, 3:2 pulldown television system.

This analysis can be applied to other motion rendition systems. FIG. 4 shows the motion of the well-known 3:2 pulldown system in which 24 frame per second film is shown at a television field rate of 60 Hz. In this case the judder cannot be described by a single 24 Hz sinewave. However the sum of a 12 Hz sinewave (peak amplitude 20% of the positional difference (43) between film frames) and a 24 Hz sinewave (peak amplitude 34%) accurately describes the judder. The sum of these two judder frequency components and the constant motion is the curve (49). The additional 12 Hz judder component (half the frequency of the camera frame rate) makes the motion rendition of the 3:2 system subjectively much worse than for conventional film projection.

The inventor has appreciated that the subjective appearance of motion in an image rendering system can be controlled by controlling the amplitude of the motion judder component, and that the appearance of a particular system can be replicated in another system by making the respective judder components equal in amplitude.

Figure 5:
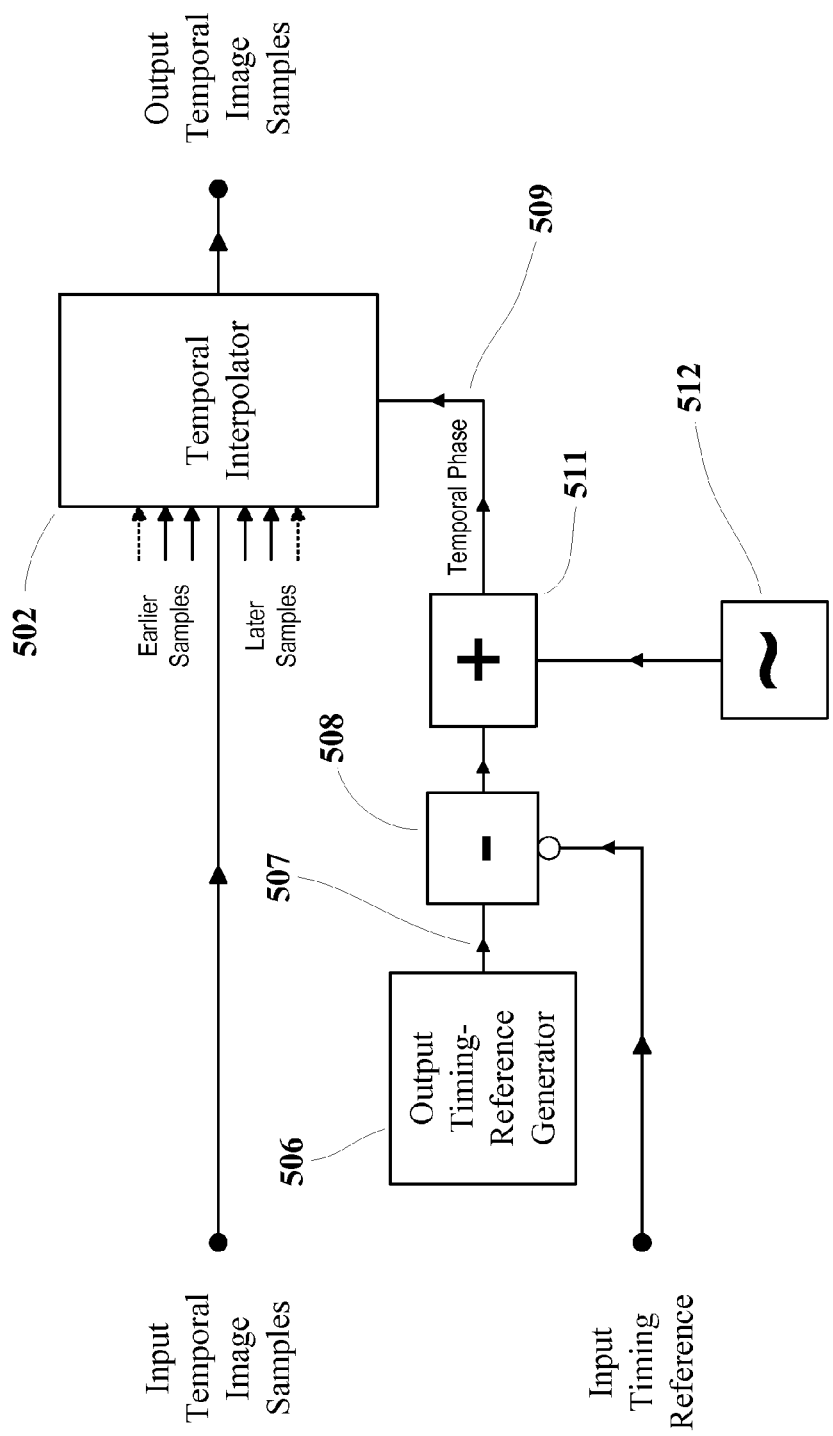
FIG. 5 shows a temporal interpolation system according to an embodiment of the invention.

For example, the system of FIG. 1 can be modified as shown in FIG. 5. In this system the temporal phase input (509) to the temporal interpolator (502) has a motion-judder component added to it in an adder (511). The judder to be added is created by a sinusoidal judder oscillator (512). At the time of each output sample request (507) from the output timing reference generator (506), the instantaneous value of the sinewave from the judder oscillator (512) is added to the temporal phase value from the subtractor (508)

If it is intended to present 24 frames per second film via a 60 Hz television system with the "look" of a 72 Hz projector, the judder oscillator (512) is set to generate a 24 Hz sinewave having a peak amplitude equal to 38.5% of the time difference between 24 Hz frames. This gives the temporal sampling pattern shown in FIG. 6.

Figure 6:
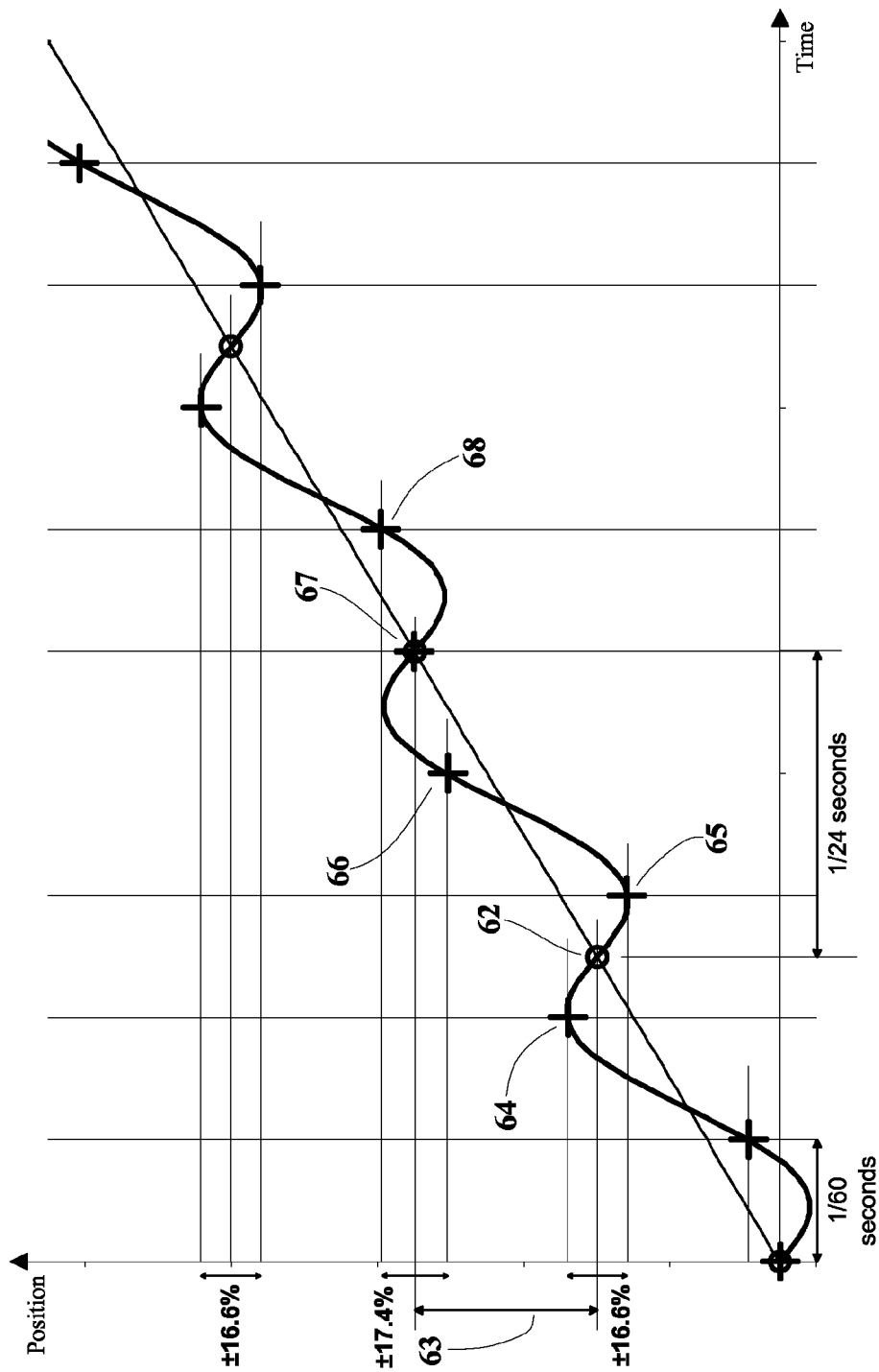
FIG. 6 shows a temporal sampling pattern of 24 frame per second film presented by a 60 field per second television system according to an embodiment of the invention.

In FIG. 6 the times and positions corresponding to the input film frames are indicated by circles, such as the position (62). The phase of the added judder component has been adjusted so that a regular sub-set of the input frames have no temporal shift; for example the frame at the position (67). A sequence of five consecutive output television fields is derived from two consecutive input film frames by applying temporal shifts as shown in table 1 below.

TABLE 1

| Output television field (as indicated in FIG. 6) | Applied Temporal Shift to obtain output television field (as percentage of time between input film frames) | Input film frame (as indicated in FIG. 6) |
| --- | --- | --- |
| (64) | +16.6% | (62) |
| (65) | −16.6% | (62) |
| (66) | −17.4% | (67) |
| (67) | 0 | (67) |
| (68) | +17.4% | (67) |

Note that the addition of the 24 Hz motion-judder component has momentarily reversed the direction of the motion between the output fields (64) and (65). This reversal occurs periodically every five fields. Note also that the magnitudes of the temporal shifts are similar to each other. If the amplitude of the judder component were changed from 38.5% to 39.0% of the temporal distance between film frames, all the required temporal shifts become equal at 17.1%, which may simplify the implementation of the invention in hardware.

Figure 7:
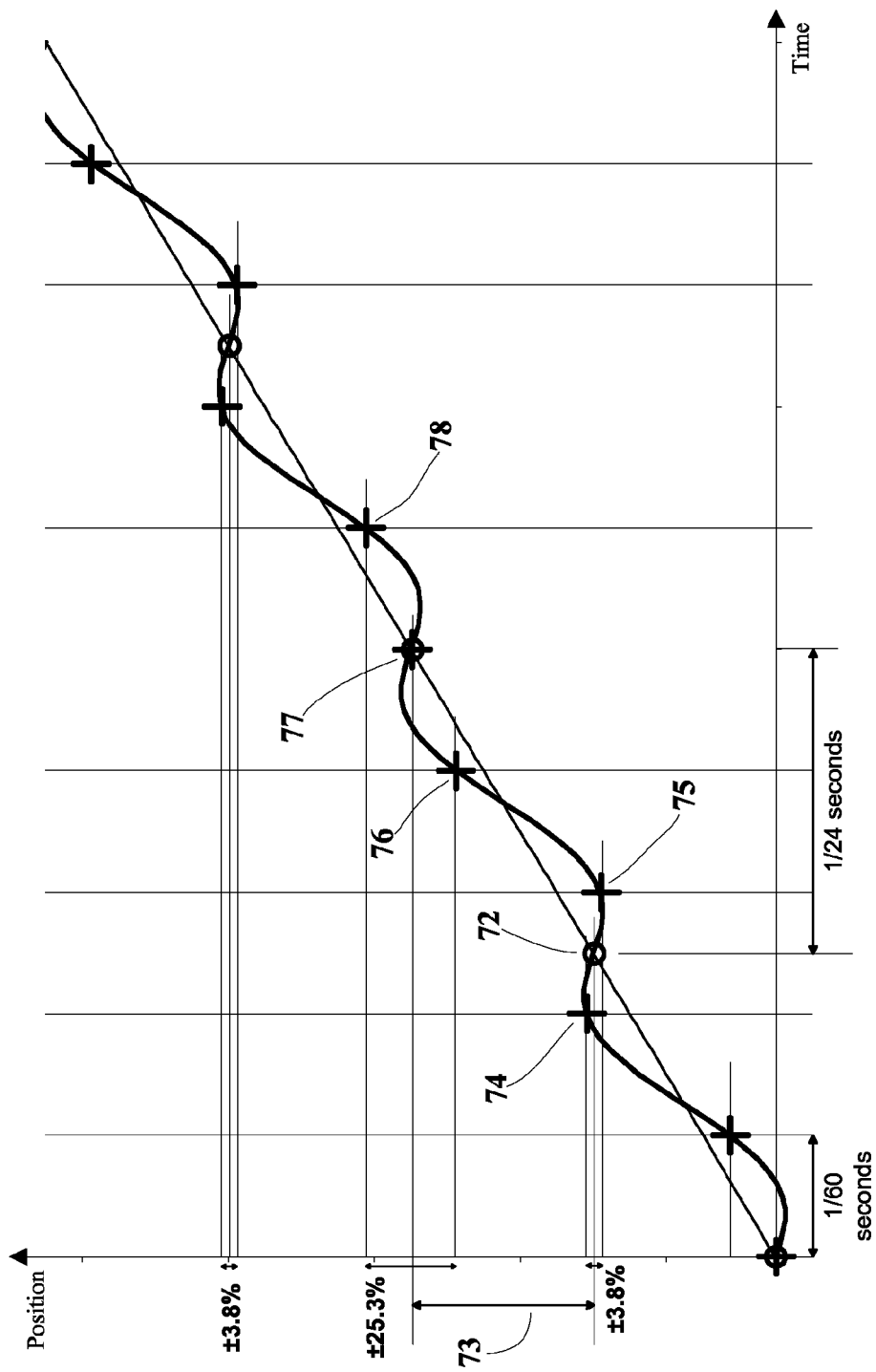
FIG. 7 shows an alternative temporal sampling pattern of 24 frame per second film presented by a 60 field per second television system according to an embodiment of the invention.

A double-flash projector presentation could be replicated by reducing the peak value of the judder to 25% of the time between input film frames. This is shown in FIG. 7. The required temporal shifts are shown in table 2 below.

TABLE 2

| Output television field (as indicated in FIG. 7) | Applied Temporal Shift to obtain output television field (as percentage of time between input film frames) | Input film frame (as indicated in FIG. 7) |
| --- | --- | --- |
| (74) | +3.8% | (72) |
| (75) | −3.8% | (72) |
| (76) | −25.3% | (77) |
| (77) | 0 | (77) |
| (78) | +25.3% | (77) |

Once again, the direction of motion is reversed every five fields, as at the fields (74) and (75).

Figure 8:
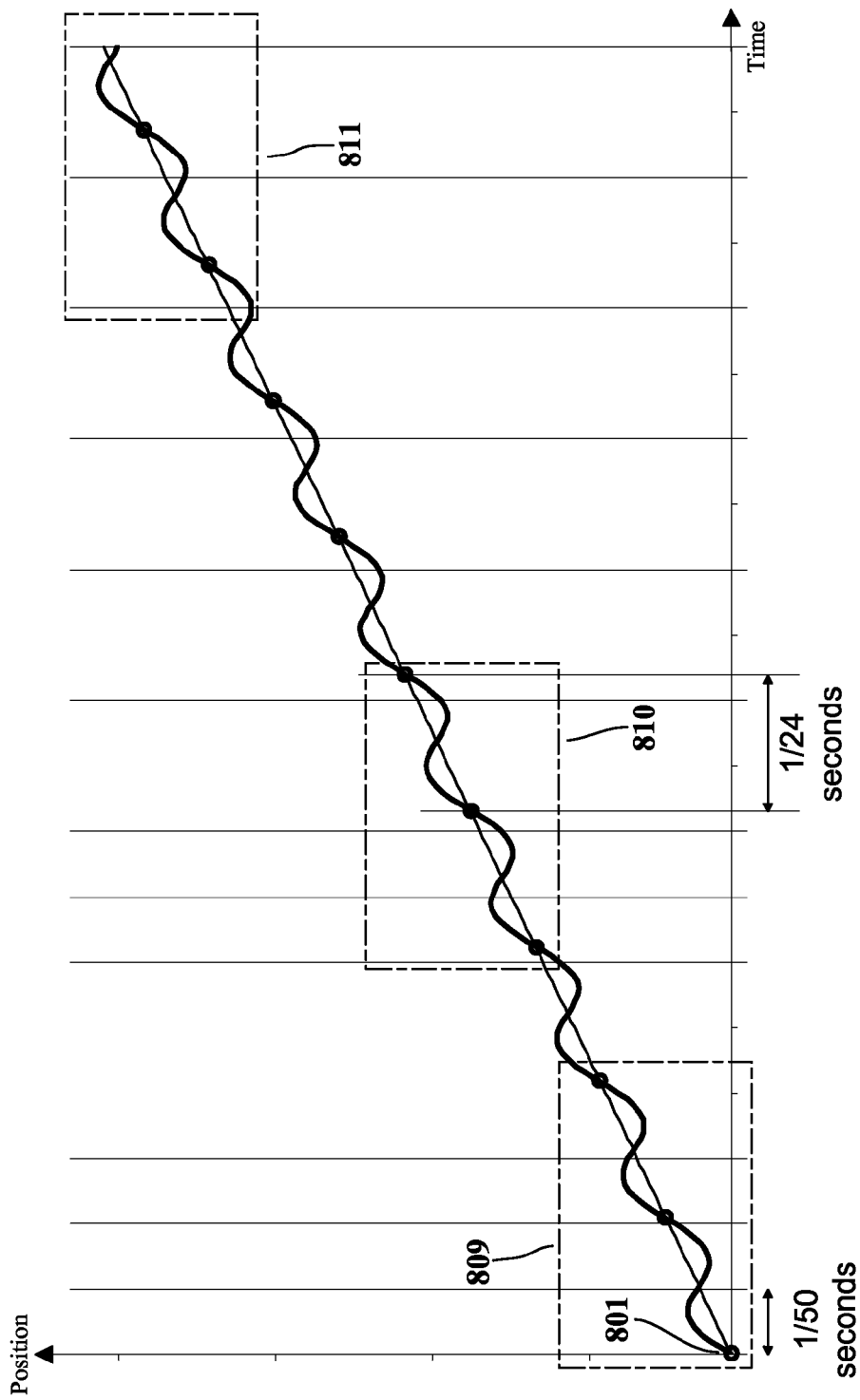
FIG. 8 shows a temporal sampling pattern of 24 frame per second film presented by a 50 field per second television system according to an embodiment of the invention.

The invention can also be applied to the presentation of 24 frame per second film via a 50 field per second television system. An example is shown in FIG. 8, which shows 24 Hz sinusoidal judder added to smooth motion. The times and positions of the film frames are marked by circles, and the times of output television fields are indicated by vertical grid lines in the same way in previous Figures. The positive zero crossings of the judder are synchronized to the times of the film frames. It can be seen that the phase relationship of the judder (and the film frame times) to the output field times varies, and so the required temporal shift that must be applied to each output field (so as to realize the judder) also varies.

Figure 9:
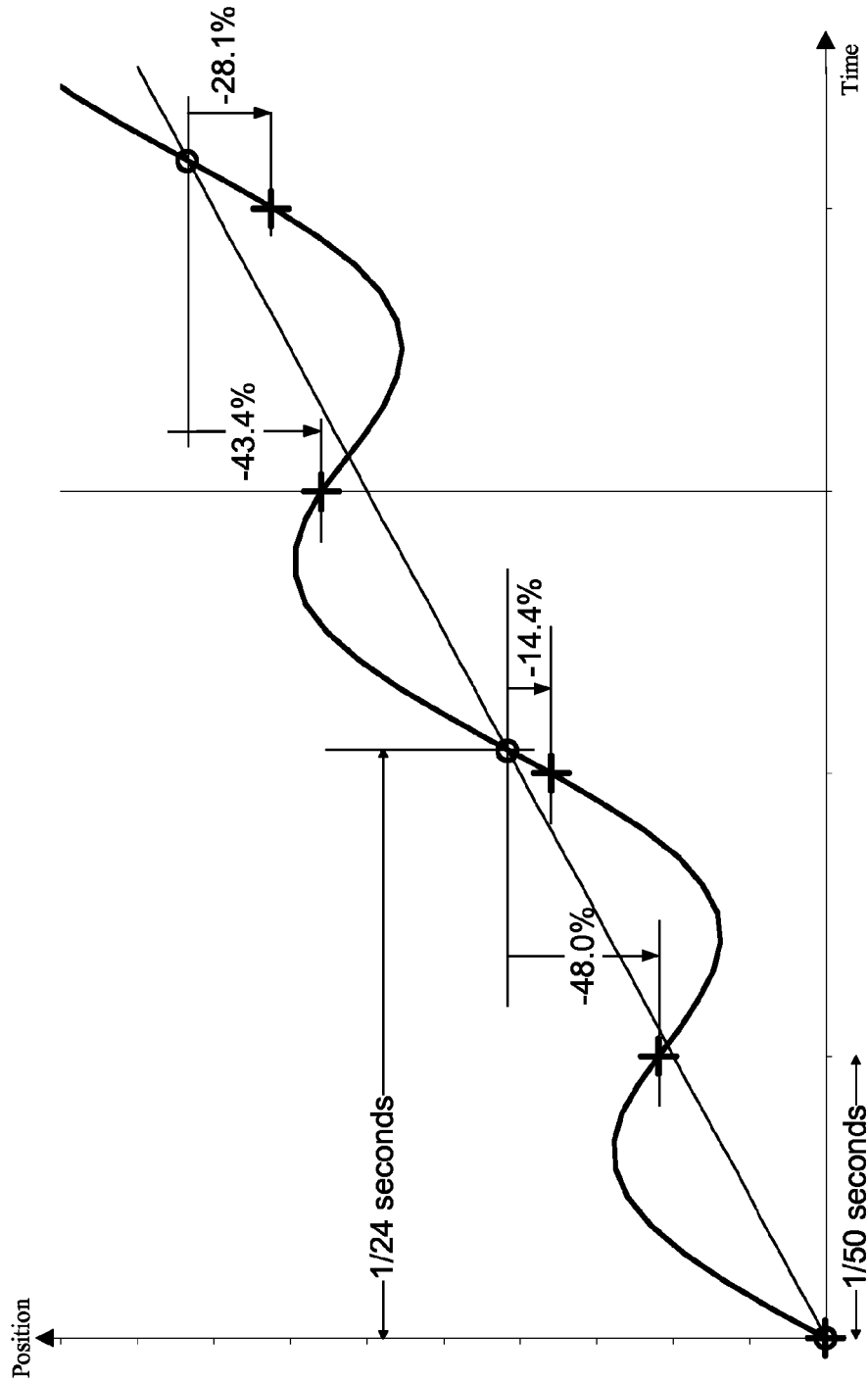
FIGS. 9, 10 and 11, show enlarged portions of the temporal sampling pattern of FIG. 8.
Figure 10:
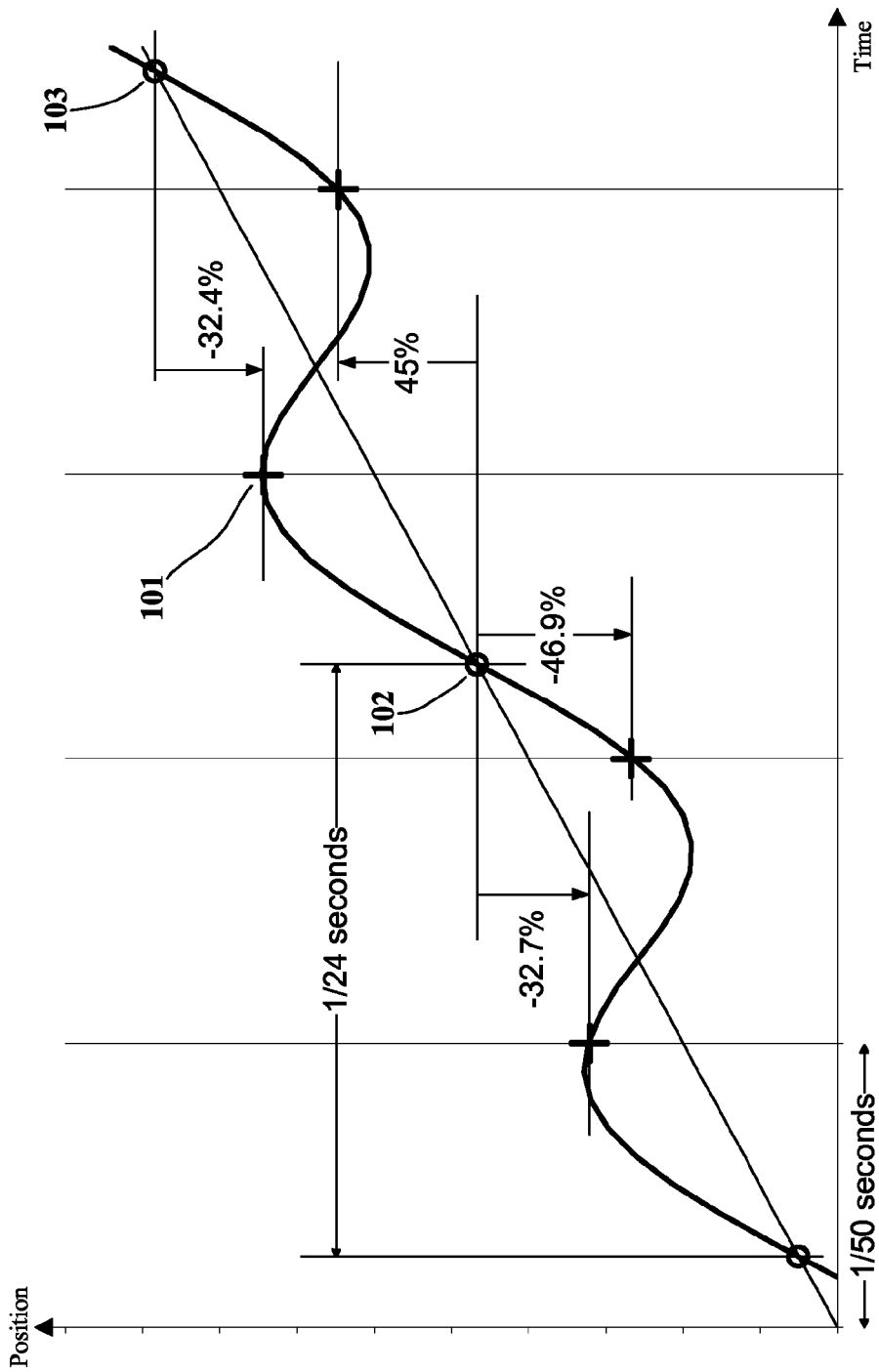
Figure 11:
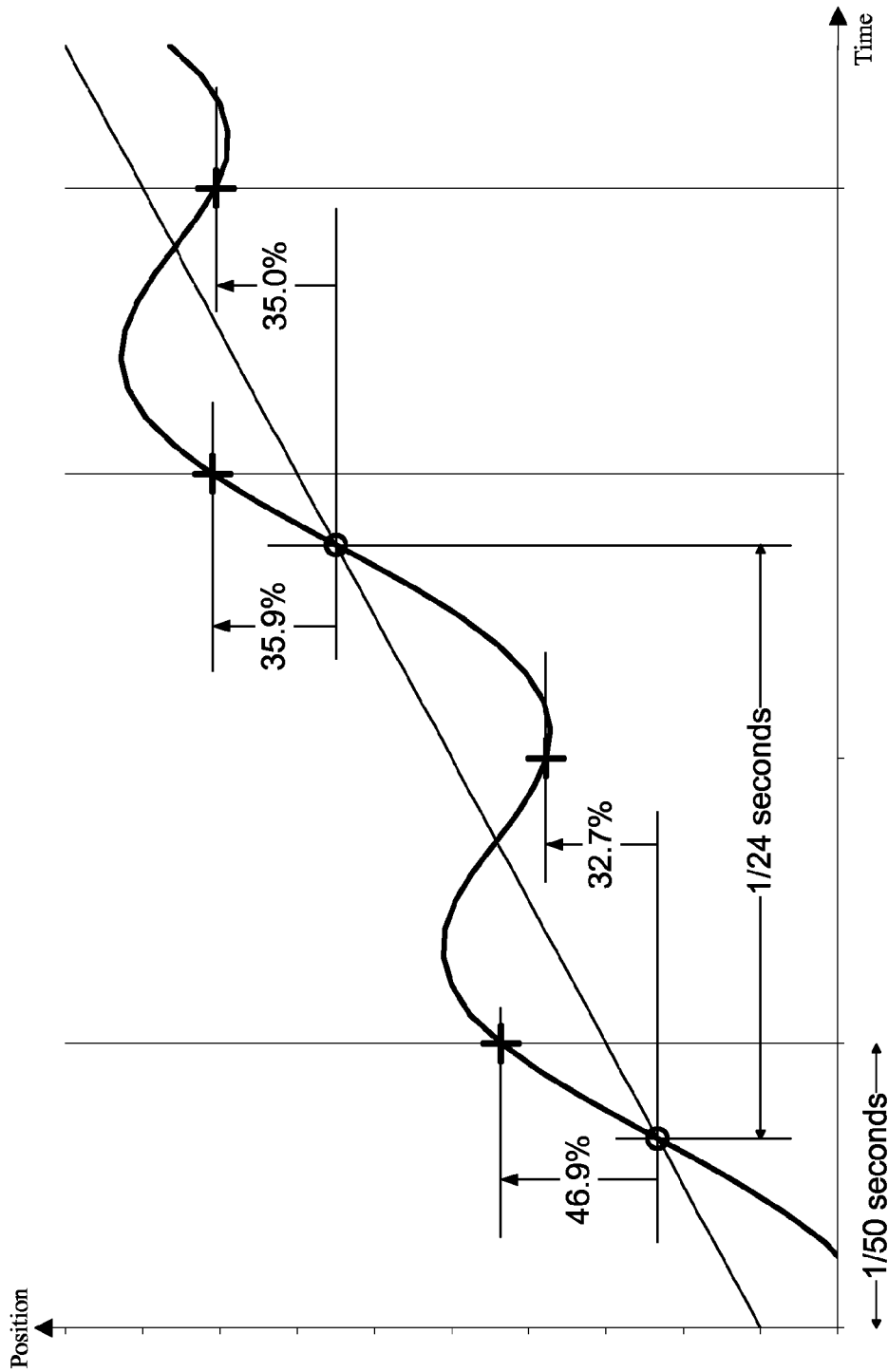

Three exemplary regions (809), (810) and (811) within FIG. 8 are shown at an enlarged scale in FIGS. 9, 10 and 11 respectively. In all these Figures the judder has a peak amplitude of 38.5% of the positional difference between film frames; i.e. equivalent to a 72 Hz, triple flash projector. Note that only the first frame (801) of the ten film frames shown in FIG. 8, coincides with the time of an output television field; this coincidence occurs once every 25 fields, or 12 film frames.

It can be seen from FIGS. 8 to 11 that a large number of different temporal shift values are required, and that the film frame which is closest in time to a particular output television field may not be closest to the required position. For example, in FIG. 10, the output field (101) is closest in time to the input film frame (102), but the succeeding film frame (103) is closest to the required position. If the frame (102) were to be shifted to the required output (101), a (forward) shift of more than 50% of the positional difference between film frames would be required; however, the field (103) need only be shifted (backwards) 32.4%. (The skilled person will appreciate that shifted fields may be derived from information from more than one film frame.)

The varying magnitude of the shift values, as the relative phase of the judder relative to the output field times varies, may be visible as a low frequency variation in the character of the jitter. This may be avoided by setting the judder frequency to a sub-multiple of the television field rate. For example 25 Hz judder could be applied to 24 frame per second film portrayed via a 50 field per second television system. However, the change in the operation of the temporal interpolator as the required shift reaches 50% of the time between film frames may still be visible.

Figure 12:
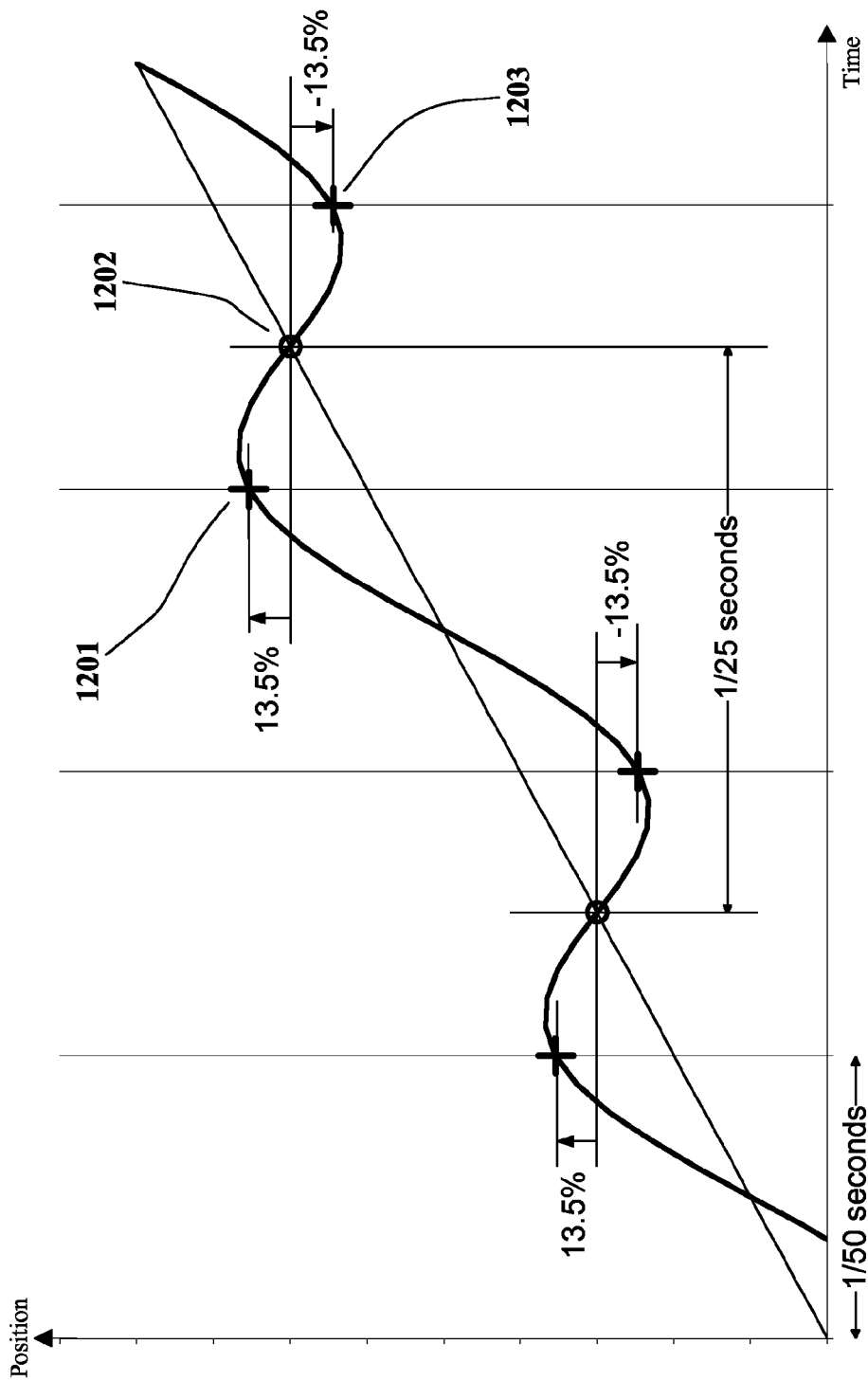
FIG. 12 shows a temporal sampling pattern of 25 frame per second film presented by a 50 field per second television system according to an embodiment of the invention.

A more satisfactory approach is to run the film at a frame rate equal to a sub multiple of the television field rate and apply judder at that rate; i.e. 25 Hz judder applied to 25 frames per second film in a 50 field per second television system. FIG. 12 shows this situation with 38.5% judder added. The temporal shift values all have a magnitude of 13.5%.

Figure 13:
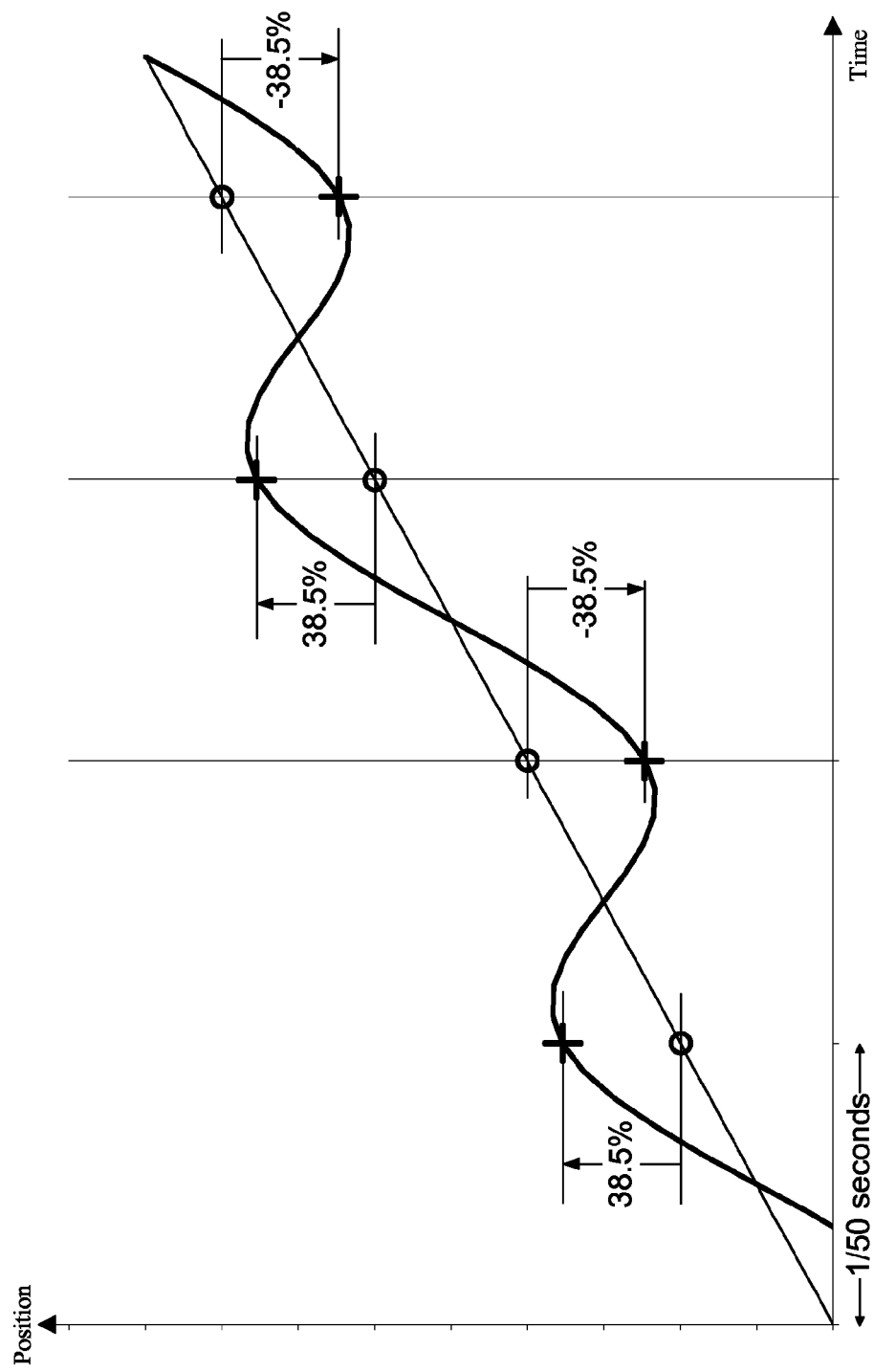
FIG. 13 shows a temporal sampling pattern of 50 field per second television modified to resemble 25 frame per second film projection according to an embodiment of the invention.

The examples described so far have had inputs with film-like temporal sampling rates. Another application of the invention is to process the higher temporal sampling rates of television inputs so that they look as though they were presented cinematically. This is achieved by adding motion judder, at the frequency of a typical film frame-rate, to the input temporal samples. FIG. 13 shows how 50 field per second video material can be modified to replicate the appearance of 25 frame per second film. As in other figures the times and positions corresponding to the input video fields are indicated by circles, and the positionally shifted output fields are indicated by crosses. If a 25 Hz sinusoidal judder component is phased so that the peaks of the sinewave correspond with the times of the video fields alternate fields are shifted forwards and backwards respectively by the peak judder magnitude. FIG. 13 shows 38.5% judder that would replicate triple flash projection.

Figure 14:
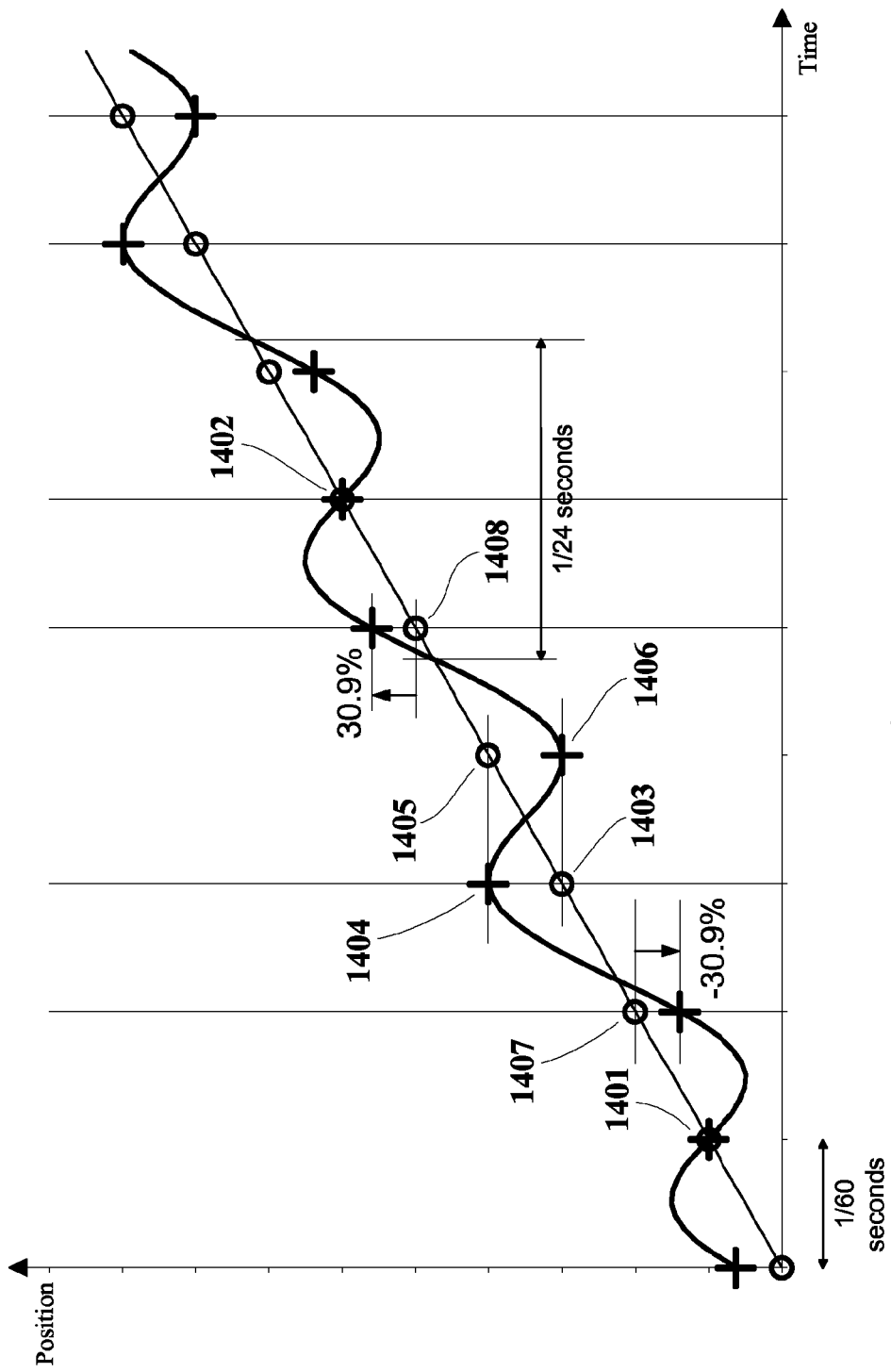
FIG. 14 shows a temporal sampling pattern of 60 field per second television modified to resemble 24 frame per second film projection according to an embodiment of the invention.

FIG. 14 shows how 60 field per second video fields can be modified to appear similar to 24 frame per second projection. In the figure a sinusoidal judder component at 24 Hz has been phased so that a regular sub-set of fields have no shift; for example the fields (1401) and (1402). The pattern of shifts repeats over a period of five frame intervals. The amplitude of the judder has been chosen to minimize the required temporal processing by making the shifted positions of two of the fields in the five-field pattern identical with the original positions of adjacent input fields. The input field (1403) should be shifted to the position (1404), however this corresponds exactly with the input field (1405) and so, rather than temporally interpolating the field (1403), the input field (1405) can be output directly in place of input field (1403). Similarly input field (1403) is output in place of input field (1405) as it corresponds to the required temporal position (1406).

The judder amplitude that achieves this simplification is 42.1% of the temporal distance between (the notional) 24 frame per second film frames. Only two fields in the five field sequence require interpolation: the field (1407) is moved backwards by 30.9%; and the field (1408) is moved forwards by the same distance. Clearly other values of judder may involve temporally interpolating more fields.

The system of FIG. 5 need not be implemented with a motion-compensated temporal interpolator. Bilinear interpolation may be used in which a weighted sum of two adjacent input temporal samples is formed such that the 'centre of gravity' of the weights corresponds to a required output temporal position. The term centre of gravity of a weighted sum of contributions is used here to mean the time at which:

$$\Sigma wi \cdot xi = 0$$

Where: wi is the weight applied to contribution i, xi is the time difference between the centre of gravity and the time of the input sample weighted by wi; and, the summation is made over all the contributions to the weighted sum.

For example, if the temporal phase value (509) is ¼, the weighted sum will comprise 75% of the current input temporal sample added to 25% of the following input temporal sample. And, the centre of gravity is situated 25% of the input sample pitch after the first input sample.

Figure 15:
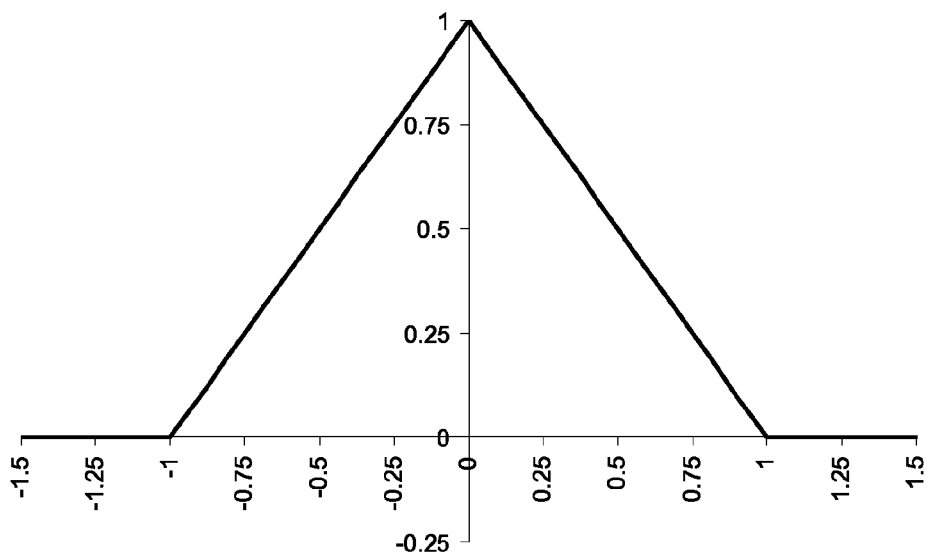
FIG. 15 shows a bilinear interpolation aperture.

The skilled person will appreciate that a temporal interpolation process that forms weighted sums of input samples to derive an interpolated output sample is a polyphase filter process that can be described by an 'aperture function', which defines the sample weights in terms of the respective time differences between the respective input samples and the required output sample time. FIG. 15 shows the aperture function for a bilinear temporal interpolator. The horizontal axis represents time, relative to the time of the required interpolated output sample, in units of the period of the input sampling frequency. As no more than two input samples contribute to an output sample, the width (of the non-zero portion) of the aperture is two input sample periods.

Figure 16:
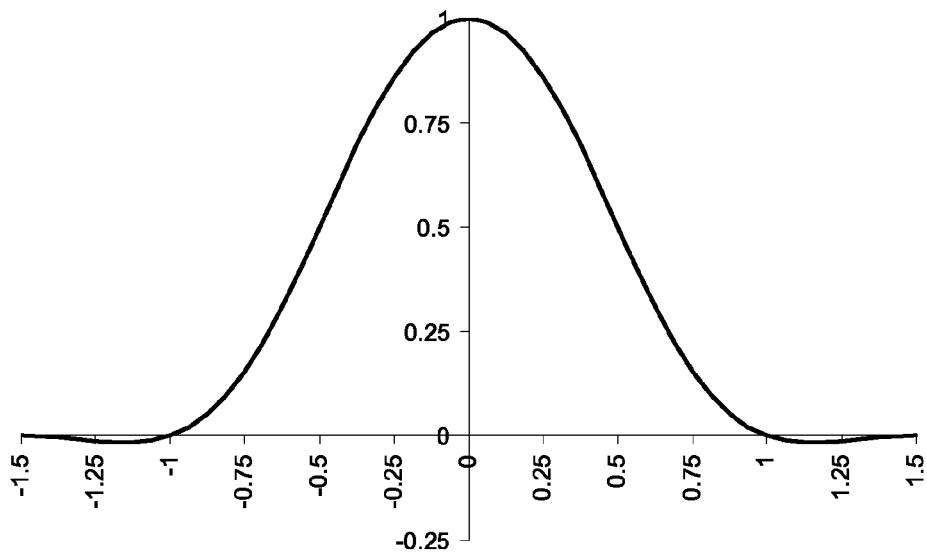
FIG. 16 shows a higher-order interpolation aperture

FIG. 16 shows an example of a higher-order interpolation aperture that is three sample periods wide. As is well-known, higher order interpolators can be designed to have an improved frequency response with less loss of wanted frequency components and better control of alias components. The choice of aperture width (i.e. the number of input samples that are used to make each output sample) is a compromise between complexity and propagation delay, as opposed to the degree of control of the frequency response.

Particular required temporal shift values correspond to discrete 'phases' of the interpolation aperture, each phase comprising a different weighted sum. In an alternative embodiment of the invention, the design of the filter phases of the interpolator (502) takes into account the required judder component that corresponds to each phase, so that the temporal phase values (507) can be passed directly to the interpolator (502), thus avoiding the need for the judder oscillator (512) and the adder (511). Examples of suitable interpolation phases according to this principle will now be described.

If the timing of the input temporal samples is related to the required judder frequency, as is usually the case, the number of required filter phases can be quite small. In the examples shown in FIGS. 6 and 7, two pairs of equal and opposite temporal shift values are required. In the example shown in FIG. 7 only five interpolation phases are needed and the corresponding sample weights are shown in table 3 below. Table 3 shows bilinear interpolation with the aperture shown in FIG. 15. Each row in the table corresponds to a filter phase; the phases are symmetrical about a central phase and so the corresponding rows in the table are numbered from −2 through to zero and up to +2. The second column shows the output sample temporal phase value (507) that selects the respective phase in the interpolator (502). The position of each interpolated output sample corresponds to the centre of the interpolation aperture, which corresponds to the position of the centre of gravity of the input sample weights. The right-most column of the table shows this centre of gravity position relative to the position of current input sample, as a percentage of the time between adjacent input samples.

TABLE 3

| Filter Phase Number | Temporal Phase Value (percentage of input sample pitch) | Exemplary Sample Shifts (as in FIG. 7) | | Bilinear Interpolation Weights | | | Centre of Gravity of Filter Phase |
|---|---|---|---|---|---|---|---|
| | | Current Input Sample | Output sample | Weight of 1st (earlier) Input Sample | Weight of 2nd (current) Input Sample | Weight of 3rd (later) Input Sample | |
| −2 | −40% | 77 | 76 | 25.3% | 74.7% | | −25.3% |
| −1 | −20% | 72 | 74 | | 96.2% | 3.8% | +3.8% |
| 0 | 0 | 77 | 77 | | 100% | | 0 |
| +1 | +20% | 72 | 75 | 3.8% | 96.2% | | −3.8% |
| +2 | +40% | 77 | 78 | | 74.7% | 25.3% | +25.3% |

Table 4 shows an equivalent table for the higher-order, three-tap interpolation aperture shown in FIG. 16. The position of each interpolated output sample corresponds to the centre of the aperture, and, for some phases, there is a small difference between this position and the centre of gravity of the input sample weights. This difference has a maximum value a little less than 9% of the time between adjacent input samples, and is related to the frequency response of the interpolation process. For this reason table 4 shows the aperture centre position rather than the position of the centre of gravity. (As in table 3, the position is shown relative to the current input sample position.)

TABLE 4

| Filter Phase Number | Temporal Phase Value (percentage of input sample pitch) | Exemplary Sample Shifts (as in FIG. 7) | | Interpolation Weights | | | Centre of Interpolation Aperture |
|---|---|---|---|---|---|---|---|
| | | Current Input Sample | Output sample | Weight of 1st (earlier) Input Sample | Weight of 2nd (current) Input Sample | Weight of 3rd (later) Input Sample | |
| −2 | −40% | 77 | 76 | 15.68% | 85.53% | −1.21% | −25.3% |
| −1 | −20% | 72 | 74 | −0.70% | 99.45% | 1.25% | +3.8% |
| 0 | 0 | 77 | 77 | | 100% | | 0 |
| +1 | +20% | 72 | 75 | 1.25% | 99.45% | −0.70% | −3.8% |
| +2 | +40% | 77 | 78 | −1.21% | 85.53% | 15.68% | +25.3% |

In the case shown in FIG. 12 there are only two filter phases and table 5 is the corresponding table for the FIG. 15 bilinear interpolation aperture.

TABLE 5

| Filter Phase Number | Temporal Phase Value (percentage of input sample pitch) | Exemplary Sample Shifts (as in FIG. 12) | | Bilinear Interpolation Weights | | | Centre of Gravity of Filter Phase |
|---|---|---|---|---|---|---|---|
| | | Current Input Sample | Output sample | Weight of 1st (earlier) Input Sample | Weight of 2nd (current) Input Sample | Weight of 3rd (later) Input Sample | |
| −1 | −25% | 1202 | 1201 | | 86.5% | 13.5% | +13.5% |
| +1 | +25% | 1202 | 1203 | 13.5% | 86.5% | | −13.5% |

If the higher-order interpolation aperture of FIG. 16 is used, the sample weights are shown in table 6.

TABLE 6

| Filter Phase Number | Temporal Phase Value (percentage of input sample pitch) | Exemplary Sample Shifts (as in FIG. 12) | | Interpolation Weights | | | Centre of Interpolation Aperture |
|---|---|---|---|---|---|---|---|
| | | Current Input Sample | Output sample | Weight of 1st (earlier) Input Sample | Weight of 2nd (current) Input Sample | Weight of 3rd (later) Input Sample | |
| −1 | −25% | 1202 | 1201 | −1.59% | 95.69% | 5.90% | +13.5% |
| +1 | +25% | 1202 | 1203 | 5.90% | 95.69% | −1.59% | −13.5% |

Note that, apart from the central phase of the FIG. 7 case, the centers of gravity of the bilinear filter phases and the centers of the higher-order interpolation apertures do not correspond to the temporal phases of the required output samples. This is in marked contrast to prior-art temporal interpolators where the centre of each interpolation filter phase corresponds directly with the temporal phase of the corresponding output temporal sample.

Up till now the input temporal samples have been assumed to be evenly spaced. This may not always be so and the invention can be applied to irregular input temporal samples, provided that the timing of the samples is known. Any deviation from uniform timing (i.e. an input judder component) can be subtracted from the added judder to obtain the required output motion characteristic. An important case of unevenly timed input samples is 3:2 pulldown television. If the repeated input fields are discarded, and the remaining input fields are evenly re-timed, an input motion profile as at (41) to (44) in FIG. 4 results. This pattern can be modified as described above to achieve a desired output motion-judder pattern.

In the above description the temporal samples have been considered as instantaneous, i.e. as temporal delta functions. However, as explained in the introduction to this specification, this is not the case. Display devices 'hold' each displayed image for some period; this may determined by the projector shutter, the persistence of a cathode ray tube phosphor, or the light-valve of some other electronic display device. It is well known that the frequency response of a sample-and-hold device is a (sin x)/x function which falls monotonically to a first null where x is equal to π, and then has a set of band-pass responses separated by nulls at multiples of π. The relationship between x and frequency depends on the ratio of the hold time to the sample period. If the hold time is equal to the sample period the first null occurs at the sampling frequency; for shorter hold times the frequencies corresponding to the nulls are increased.

An exact analysis of the equivalence of the judder from different display devices would include consideration of display hold time. However, as the objective is to achieve a particular subjective level of judder, it will often be preferable to choose the level of added judder by subjective assessment.

The filter aperture of an FIR temporal interpolator will have temporal frequency response that is not flat. If judder is present in the input signal, then the filter aperture can be chosen to attenuate or amplify components at the temporal frequency of that input judder, or to eliminate a particular judder frequency. In this case there is no need to add a judder frequency to the temporal phase value that controls the temporal interpolator; the input judder amplitude is changed to a desired judder amplitude by virtue of the temporal frequency response of the temporal interpolator. For example the 12 Hz judder component that is present in conventional 3:2 pull-down television film presentation can be attenuated by a null in the interpolator's temporal frequency response at 12 Hz.

The invention can be applied at any point in a production, transmission or distribution chain; and, the process can be carried out on analogue signals, streaming data or stored data. Provided the timing of the acquisition of the input temporal samples (in the original camera) is known (or can be inferred from other data), and the intended display timing of output temporal samples is also known (or can be inferred from other data), the value of the motion judder component to be applied to each output temporal sample can be calculated. The inputs to this calculation are:

The required judder function (typically a sinewave)
The required judder frequency (typically the original temporal sampling rate or a lower, harmonically-related frequency).
The required peak judder amplitude.
The phase relationship between the required judder function and the intended presentation times of the output temporal samples.

Once the instantaneous value of the judder function at the intended presentation time of each output temporal sample is calculated, the required temporal position of that output temporal sample is known; the temporal difference from the nearest input sample can then be determined and used to control the temporal interpolator.

The judder function and its amplitude may be chosen on artistic grounds to obtain a particular subjective effect or on technical grounds so as to replicate the characteristics of a known display technology.

The phase relationship between the judder function and the intended presentation times of the output temporal samples may be chosen to simplify the implementation of the temporal interpolation process—for example to reduce the number of required phases of an FIR temporal interpolation filter.

The application of the invention may, or may not, change the number of temporal samples. All that is required is that the motion portrayed by the output samples is modified by the intended motion judder.

The spatial sampling of television has not been previously mentioned in this specification as it is not relevant to the understanding of the invention by the skilled person. It is well known that, in interlaced television systems, separate temporal presentations of the same film frame may have different spatial sampling patterns. The known art of 'de-interlacing' may be used convert between these different spatial sampling patterns.

In this specification nominal field and frame rates have been quoted as examples. The above described principles are applicable to 59.94 Hz field rate television systems as well as systems with integer-frequency rates.

Thus, the invention provides, among other things, a motion image rendering system. Various features and advantages of the invention are set forth in the following claims.

What is claimed is:

1. A method of modifying, in a processor, an input sequence of temporal image-samples representing a moving image so as to obtain an output sequence of temporal image-samples in which the appearance of the said motion has been changed, the method comprising:
   temporally interpolating said input temporal image-samples to create the said output sequence; and
   introducing an intentional, periodic motion-judder component that is visible when the said output temporal image-samples are displayed;
   wherein the said intentional motion-judder component is determined by a sine function.

2. A method according to claim 1, wherein the magnitude of the motion-judder component applied to a temporal image-sample is proportional to the instantaneous value of a temporal sinewave at the intended time of display of the temporal image-sample.

3. A method according to claim 1, wherein the frequency of the said sine function is equal to the original temporal sampling frequency of the input temporal image-samples.

4. A method according to claim 1, further comprising motion-compensating the said temporal interpolation.

5. A method according to claim 1, further comprising performing the said temporal interpolation by a polyphase FIR filter.

6. A method according to claim 5, wherein at least one phase of the said polyphase FIR filter is derived from an interpolation aperture position that does not correspond to the intended display time of the respective interpolated output temporal sample created by that filter phase.

7. An apparatus for modifying an input sequence of temporal image-samples representing a moving image so as to obtain an output sequence of temporal image-samples in which the appearance of the said motion has been changed, the apparatus comprising:
   a temporal interpolator configured to receive said input samples; and
   a temporal phase signal generator configured to generate a temporal phase signal,
   wherein the temporal interpolator serves, through interpolation of said input samples under the control of said phase signal, to create the said output sequence, and
   wherein the temporal phase signal includes a periodic motion-judder component such that intentional, visible, periodic motion-judder is introduced when the said output temporal image-samples are displayed;
   in which the said intentional motion-judder component is determined by a sine function.

8. An apparatus according to claim 7, wherein the magnitude of the motion-judder component applied to a temporal image-sample is proportional to the instantaneous value of a temporal sinewave at the intended time of display of that temporal image-sample.

9. An apparatus according to claim 7, wherein the frequency of the said sine function is equal to the original temporal sampling frequency of the input temporal image-samples.

10. An apparatus according to claim 7, wherein the said temporal interpolation is motion-compensated.

11. An apparatus according to claim 7, wherein the said temporal interpolation is performed by a polyphase FIR filter.

12. An apparatus according to claim 11, wherein at least one phase of the said polyphase FIR filter is derived from an interpolation aperture position that does not correspond to the intended display time of the respective interpolated output temporal sample created by that filter phase.

13. A non-transitory computer readable medium comprising:
   instructions configured to cause a programmable processor to modify an input sequence of temporal image-samples representing a moving image so as to obtain an output sequence of temporal image-samples in which the appearance of the said motion has been changed,
   wherein the said input temporal image-samples are temporally interpolated to create the said output sequence and an intentional, periodic motion-judder component is introduced that is visible when the said output temporal image-samples are displayed;
   wherein the said intentional motion-judder component is determined by a sine function.

* * * * *